United States Patent
Nourkhiz Mahjoub et al.

(10) Patent No.: US 11,804,128 B2
(45) Date of Patent: Oct. 31, 2023

(54) TARGET CLASSIFICATION

(71) Applicant: Honda Motor Co., Ltd., Tokyo (JP)

(72) Inventors: Hossein Nourkhiz Mahjoub, Ann Arbor, MI (US); Yasir Khudhair Al-Nadawi, Ann Arbor, MI (US); Paritosh Kelkar, Dearborn, MI (US); Mehmmood Abd, Windsor (CA); Kathiravan Natarajan, Ypsilanti, MI (US)

(73) Assignee: HONDA MOTOR CO., LTD., Tokyo (JP)

( * ) Notice: Subject to any disclaimer, the term of this patent is extended or adjusted under 35 U.S.C. 154(b) by 148 days.

(21) Appl. No.: 17/219,121

(22) Filed: Mar. 31, 2021

(65) Prior Publication Data
US 2022/0319306 A1    Oct. 6, 2022

(51) Int. Cl.
*G08G 1/01* (2006.01)
*H04W 4/46* (2018.01)

(52) U.S. Cl.
CPC ......... *G08G 1/0129* (2013.01); *G08G 1/0112* (2013.01); *H04W 4/46* (2018.02)

(58) Field of Classification Search
None
See application file for complete search history.

(56) References Cited

U.S. PATENT DOCUMENTS

| | | | |
|---|---|---|---|
| 8,731,742 B2 | 5/2014 | Zagorski et al. | |
| 9,830,814 B2 | 11/2017 | Thompson et al. | |
| 10,145,696 B2 | 12/2018 | Hwang et al. | |
| 10,761,535 B2 | 9/2020 | Chen et al. | |
| 10,789,848 B2 | 9/2020 | Altintas et al. | |
| 2017/0365166 A1* | 12/2017 | Lu | G08G 1/0112 |
| 2018/0050673 A1* | 2/2018 | D'sa | B60T 8/58 |

(Continued)

FOREIGN PATENT DOCUMENTS

| WO | WO2019245333 A1 | 12/2019 |
|---|---|---|
| WO | WO202065524 A1 | 4/2020 |

(Continued)

OTHER PUBLICATIONS

About Camp LLC, Crash Avoidance Metrics Partners LLC, (2021). https://www.campllc.org/about-camp/.

*Primary Examiner* — Rebecca E Song
(74) *Attorney, Agent, or Firm* — RANKIN, HILL & CLARK LLP (57) ABSTRACT

According to one aspect, a host vehicle (HV) equipped with a system for target classification may include a communication unit receiving a first message from a remote vehicle (RV) at a first time. The communication unit may receive a second message from the RV at a second time. An operation unit may append the path history position trail information of the first message with the path history position trail information of the second message based on an overlap between the path history position trail information of the first message and the second message to determine an overall path history position trail for the RV and calculate a lane level position offset between the HV and the RV based on the overall path history position trail for the RV and a current position of the HV and a result of lane change detection module of the HV about the HV and RV lane changes.

20 Claims, 6 Drawing Sheets

(56) References Cited

U.S. PATENT DOCUMENTS

| | | | |
|---|---|---|---|
| 2018/0126976 A1* | 5/2018 | Naserian | B60W 10/06 |
| 2018/0257660 A1 | 9/2018 | Ibrahim et al. | |
| 2019/0274017 A1* | 9/2019 | Wang | H04L 12/1854 |
| 2019/0294966 A1 | 9/2019 | Khan et al. | |
| 2020/0045568 A1 | 2/2020 | Kwon et al. | |
| 2020/0192355 A1* | 6/2020 | Lu | G08G 1/205 |
| 2020/0327343 A1* | 10/2020 | Lund | H04W 4/46 |
| 2020/0339124 A1 | 10/2020 | Vassilovski et al. | |

FOREIGN PATENT DOCUMENTS

| | | |
|---|---|---|
| WO | WO202065525 A1 | 4/2020 |
| WO | WO202065527 A1 | 4/2020 |
| WO | WO202071890 A1 | 4/2020 |

\* cited by examiner

TARGET CLASSIFICATION

BACKGROUND

Vehicle-to-vehicle (V2V) communication may be utilized to transmit and receive packets of data which may include global positioning system (GPS) information, controller area network (CAN) information, sensory information, path history trail (PH) information, path prediction (PP) information, etc., which may be included as a basic safety message (BSM) or as a V2V message transmitted between vehicles on which a vehicle communication terminal is mounted. This V2V communication may be utilized for collision mitigation, for example.

However, when the relative position of a target in lane-level resolution with respect to a host vehicle (HV) position is classified using path history trail, path prediction, other information included in the BSM received from RV, and HV own information to provide a service to the respective vehicles at the time of performing the V2V communication, if one vehicle is greater than a threshold distance from the other vehicle, this cannot be determined as accurately. A further challenge is that messages may be anonymized using random identifiers. Because of this, it is difficult to directly determine if two messages came from the same vehicle.

BRIEF DESCRIPTION

According to one aspect, a system for target classification associated with a host vehicle (HV) may include a communication unit and an operation unit. The communication unit may receive a first message from a remote vehicle (RV) at a first time. The first message may include path history position trail information associated with the RV from a predetermined distance range to a position of the RV at the first time. The communication unit may receive a second message from the RV at a second time. The second message may include path history position trail information associated with the RV from the predetermined distance range to a position of the RV at the second time. The operation unit may append the path history position trail information of the first message with the path history position trail information of the second message based on an overlap between the path history position trail information of the first message and the second message to determine an overall path history position trail for the RV and may calculate a lane level position offset between the HV and the RV based on the overall path history position trail for the RV and a current position of the HV.

The system for target classification may include a navigation unit determining the current position of the HV, a storage unit storing the first message and the second message, and a monitoring unit performing lane change detection for the HV based on information received from sensors or operation actions associated with the HV.

The operation unit may determine the first message and the second message are from the same RV based on the overlap between the path history position trail information of the first message and the second message. The operation unit may determine lane change detection information for the RV based on the first message and the second message from the RV and calculate the lane level position offset between the HV and the RV based on the lane change detection information and the overall path history position trail for the RV.

The first message and the second message may be basic vehicle-to-vehicle (V2V) messages. The first message and the second message may include steering wheel angle information, yaw rate information, heading information, velocity information, longitudinal acceleration information, or lateral acceleration information associated with the RV at the first time and the second time, respectively. The communication unit may receive the first message and the second message at a predetermined fixed frequency or a predetermined variable frequency. The communication unit of the HV may be engaged in vehicle-to-vehicle (V2V) communication with a communication unit of the RV.

According to one aspect, a host vehicle (HV) equipped with a system for target classification may include a communication unit and an operation unit. The communication unit may receive a first message from a remote vehicle (RV) at a first time. The first message may include path history position trail information associated with the RV from a predetermined distance range to a position of the RV at the first time. The communication unit may receive a second message from the RV at a second time. The second message may include path history position trail information associated with the RV from the predetermined distance range to a position of the RV at the second time. The operation unit may append the path history position trail information of the first message with the path history position trail information of the second message based on an overlap between the path history position trail information of the first message and the second message to determine an overall path history position trail for the RV and may calculate a lane level position offset between the HV and the RV based on the overall path history position trail for the RV, a current position of the HV, and one of lane change detection information for the RV or lane change detection information for the HV.

The host vehicle may include a navigation unit determining the current position of the HV. The operation unit may determine the first message and the second message may be from the same RV based on the overlap between the path history position trail information of the first message and the second message. The operation unit may determine lane change detection information for the RV based on the first message and the second message from the RV and calculate the lane level position offset between the HV and the RV based on the lane change detection information and the overall path history position trail for the RV.

The first message and the second message may be vehicle-to-vehicle (V2V) messages. The first message and the second message may include steering wheel angle information, yaw rate information, heading information, velocity information, longitudinal acceleration information, or lateral acceleration information associated with the RV at the first time and the second time, respectively.

According to one aspect, a method for target classification may include receiving a first message from a remote vehicle (RV) at a first time, the first message may include path history position trail information associated with the RV from a predetermined distance range to a position of the RV at the first time, receiving a second message from the RV at a second time, the second message may include path history position trail information associated with the RV from the predetermined distance range to a position of the RV at the second time, appending the path history position trail information of the first message with the path history position trail information of the second message based on an overlap between the path history position trail information of the first message and the second message to determine an overall path history position trail for the RV, and calculating a lane level position offset between a host vehicle (HV) and the RV based on the overall path history position trail for the RV and a current position of the HV.

The method for target classification may include determining the current position of the HV and storing the first message and the second message at the HV. The first message and the second message may be vehicle-to-vehicle (V2V) messages.

DETAILED DESCRIPTION

Aspects, embodiments, or examples, illustrated in the drawings, are disclosed below using specific language. It will nevertheless be understood that the aspects or examples are not intended to be limiting. Any alterations and modifications in the disclosed aspects, and any further applications of the principles disclosed in this document are contemplated as would normally occur to one of ordinary skill in the pertinent art.

The following terms are used throughout the disclosure, the definitions of which are provided herein to assist in understanding one or more aspects of the disclosure.

As used herein, the term occupant may include a driver, a passenger, a user, or an operator of a vehicle or automobile. An operating environment may include one or more roadways, one or more road segments, one or more other vehicles, one or more objects, which may be obstacles. As used herein, the term "obstacle" may include hazards, obstructions, objects in the roadway, such as other vehicles, animals, construction, debris, potholes, traffic barrels, traffic cones, etc.

As used herein, a vehicle generally refers to a vehicle, such as a remote vehicle or a host vehicle, which may be equipped with a system for target classification. The vehicles (e.g., remote vehicle or host vehicle) described herein may or may not be equipped with the system for target classification. According to one aspect, the remote vehicle may not necessarily be equipped with the system for target classification and the host vehicle may be equipped with the system for target classification.

Further, a "vehicle", as used herein, refers to any moving vehicle that may be capable of carrying one or more human occupants and is powered by any form of energy. The term "vehicle" includes cars, trucks, vans, minivans, SUVs, motorcycles, scooters, boats, personal watercraft, and aircraft, etc. In some scenarios, a motor vehicle includes one or more engines. Further, the term "vehicle" may refer to an electric vehicle (EV) that is powered entirely or partially by one or more electric motors powered by an electric battery. Additionally, the term "vehicle" may refer to an autonomous vehicle and/or self-driving vehicle powered by any form of energy. The autonomous vehicle may or may not carry one or more human occupants.

As used herein, a remote vehicle (RV) may be a vehicle broadcasting a vehicle-to-vehicle (V2V) message, which may be a basic safety message (BSM) or any other type of V2V message. As used herein, a host vehicle (HV) may be a vehicle receiving the V2V message from the RV. Stated another way, the HV may perform or execute a V2V-based function or application (e.g., the HV is the vehicle running or performing the "target classification" function). Therefore, the RV may be the vehicle transmitting the V2V messages to the HV and the RV may be positioned ahead or behind the HV. The HV may run or execute V2V-based functions utilizing the contents of the RVs' V2V messages and information local to the HV (e.g., HV own information from HV vehicle systems, such as HV sensors, HV CAN, HV GPS, etc.).

Although the RV and the HV may broadcast V2V messages to one another when within a communication sensing range, and both the RV and the HV may receive V2V messages from one another, the HV may be considered the vehicle discussed in terms of its V2V-based function (e.g., target classification) or V2V-based application since the same V2V-based function/application could potentially be running in other vehicles (RVs) simultaneously, but those vehicles would be considered RVs relative to the examination of the HV's V2V-based application. Explained yet again, a first vehicle may receive V2V messages from a second vehicle, the second vehicle may also receive V2V messages from the first vehicle, and both vehicles may perform target classification utilizing own information and the V2V message from the other vehicle, but the first vehicle may be considered the HV when examining the first vehicle's V2V-based function/application. Similarly, the second vehicle may be considered the HV when examining the second vehicle's V2V-based function/application.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, a vehicle-to-everything (V2X) communication system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

As used herein, an operating action may include a driving action, a turn signal operation, a steering operation, a braking operation, an acceleration operation, a horn operations, etc. Further, these terms may be used interchangeably throughout the disclosure.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

As discussed, vehicle-to-vehicle (V2V) communication may be utilized to transmit and receive data through a communication interface, and the data or message may include GPS information, CAN information, sensory information, path history trail information, path prediction information, etc., which may be formatted as a BSM or as a V2V message transmitted between vehicles on which a vehicle communication terminal is mounted. Typically, the V2V message may include path history trail data indicating a path history trail of the vehicle that sent or transmitted the V2V message. The path history trail may include a selected number of GPS coordinates from the GPS history of the RV 390. As described herein, the vehicle transmitting the message may be referred to as the RV 390 while the vehicle receiving the message may be referred to as the HV, according to one aspect. Further, although some of the V2V messages utilized herein are described with respect to basic safety messages, any form of suitable V2V communication is contemplated for alternate embodiments or aspects.

For example, the V2V message may include a time series of RV data or RV information, such as a steering wheel angle, a yaw rate, a lateral acceleration, lane change detection information, although any V2V information packet may be utilized. The system for target classification 100 may infer that the RV 390 has made a lane change over a course of time, such as from a moment the RV 390 was adjacent to the current HV location until a current time. The detection and classification described herein may be implemented via machine learning, rule based methods, deep learning, etc.

Typically, the V2V message may include historical position data or path history trail of a given RV (e.g., up to 200 meters of data, according to the Society of Automotive Engineers (SAE) specifications, for example). Therefore, if a given HV is within 200 meters of a given RV, most any target classification system may accurately determine if the RV 390 is entering a curve. However, because the HV and the RV 390 may travel in and out of this 200 meter range (or any other threshold range), accurate determination or classification may not always be possible using traditional techniques.

Another parameter which also contributes to the inaccuracy of the traditional techniques of target classification is inaccuracy of the traditional "Path Prediction" algorithm (specified in SAE specifications). The predicted road curvature coming from traditional SAE "Path Prediction Algorithm" is rapidly deviating from the actual curvature of the road for longer horizons within communication range ahead of "Host Vehicle", especially in curvy roads.

Generally, the HV may receive information from RVs via V2V communication and may perform calculations utilizing that information to determine a scenario associated with the HV. In other words, the HV may receive information from one or more RVs and utilize this information to make a determination about what is going on around the HV. One type of calculation the HV may perform in this regard is target classification. Target classification, as utilized herein, may refer to a calculation performed by the HV to classify the location of one or more communicating RVs relative to the host vehicle. For example, the HV may determine that an RV is one or more of intersecting left, intersecting right, ahead, ahead left, ahead right, ahead far left, ahead far right, behind, behind left, behind right, behind far left, behind far right, oncoming, oncoming left, oncoming right, oncoming far left, or oncoming far right with respect to the HV when target classification is performed. In this way, target classification may be utilized to label RVs (e.g., broadly using intersecting, oncoming, or same direction type of travel, and with more detail, using left, right, ahead, behind, etc.). Target classification may utilize a parameter, such as a lateral offset distance between the HV and RV (e.g., Lateral Offset1 distance 102 of FIG. 1 or Lateral Offset1 distance 202 of FIG. 2, described in greater detail herein). However, the focus of the target classification described herein is to provide enhanced accuracy as compared to other target classification calculations by enabling the Lateral Offset1 distance 102 of FIG. 1 or the Lateral Offset1 distance 202 of FIG. 2 even when a current location of the RV exceeds a distance covered by the RV path history trail.

Specifically, to overcome any issues associated with accurately determining target classification when a given RV greater than a threshold distance from a given HV, the HV may store previously received V2V messages. Based on position data, the HV may be able to determine which V2V messages come from the given RV. In this regard, the system for target classification 100 of the HV may append the location data from multiple V2V messages from the given RV after determining which V2V messages are associated with the given RV, thereby extending a distance covered by the RV path history trail. In this way, the system for target classification 100 may bring path history trail data to a current position of the HV. By doing so, all the past position data enables the system for target classification 100 of the HV to accurately classify the target RV (e.g., via calculating a lane level position offset between the HV and the RV 390), thereby classifying the locations of RVs in communication with the HV relative to the HV.

In this way, the system for target classification 100 described herein may enable the HV to determine whether the RV 390 is switching lanes or entering a curve when a lateral offset between a position of the RV 390 (e.g., received at the HV via the V2V message sent by the RV 390) and the x-axis or a heading of the HV changes.

Figure 1:
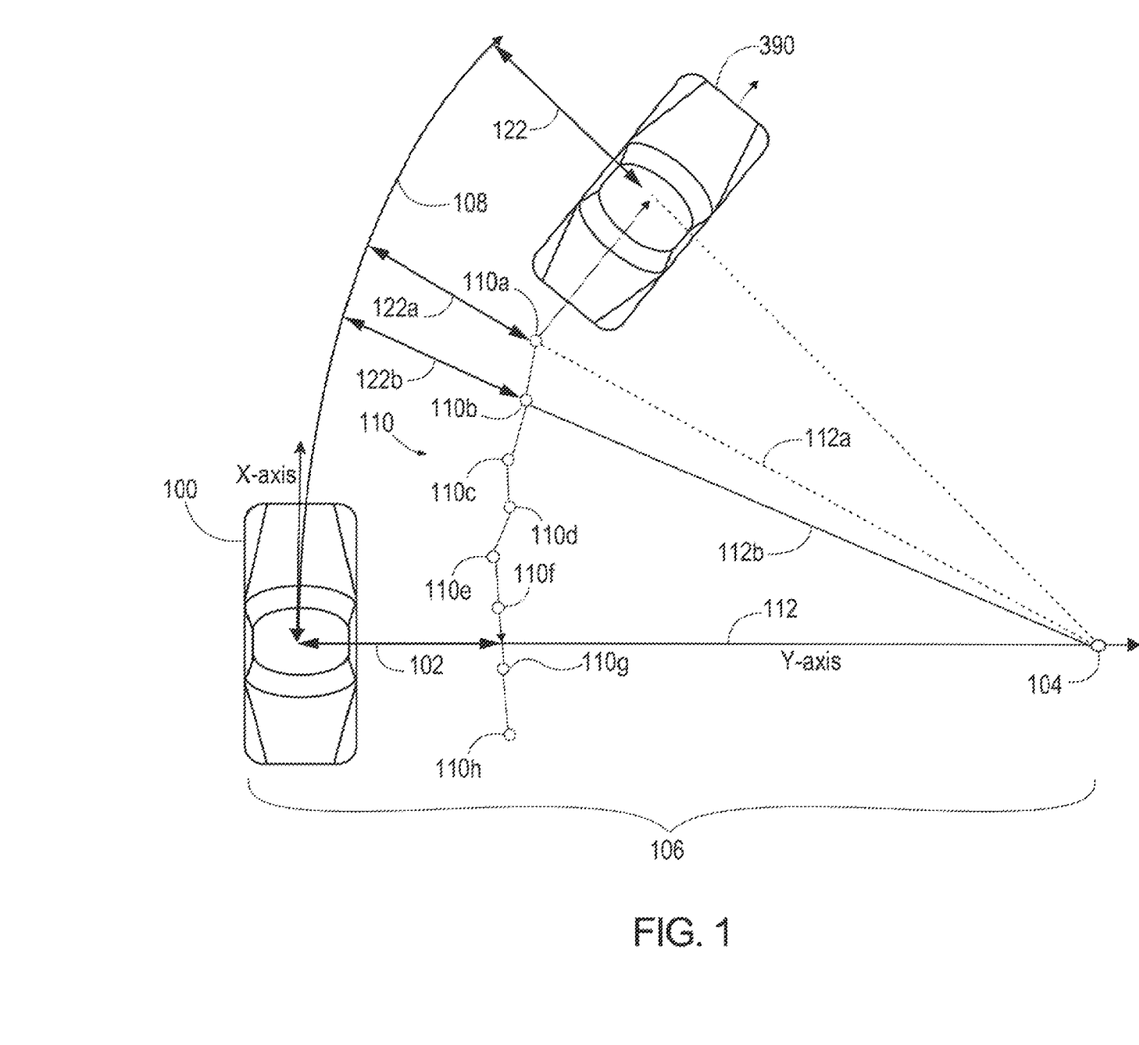
FIG. 1 is an exemplary scenario where a remote vehicle is ahead of a host vehicle equipped with a system for target classification, according to one aspect.
Figure 2:
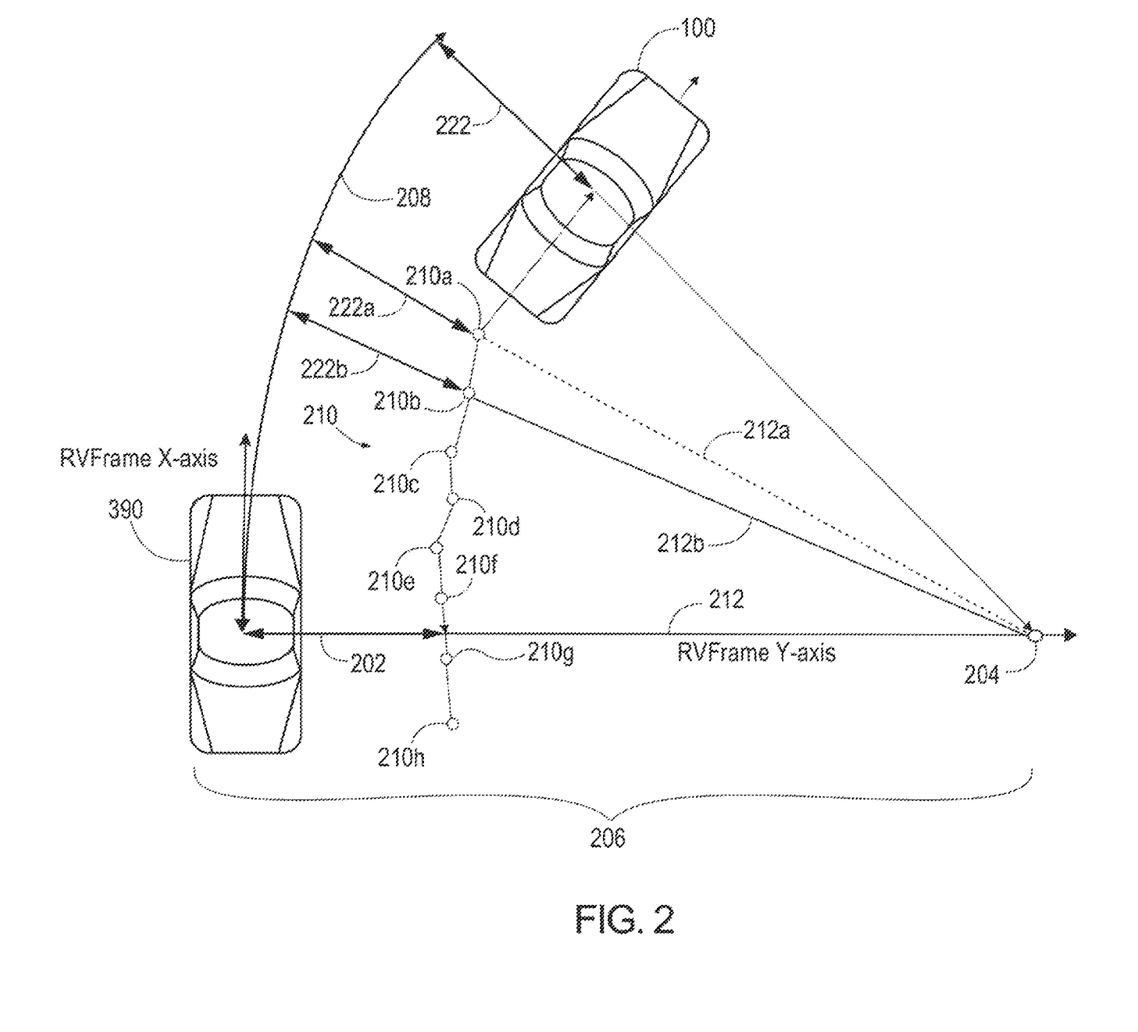
FIG. 2 is an exemplary scenario where the remote vehicle is behind the host vehicle equipped with the system for target classification, according to one aspect.

FIG. 1 is an exemplary scenario where the RV 390 is ahead of the HV equipped with a system for target classification 100, according to one aspect. FIGS. 1-2 are described with respect to and in conjunction with the component diagram of FIG. 3 below and provide improved techniques for target classification, building upon other target classification techniques, such as Crash Avoidance Metrics Partnership, LLC (CAMP) target classification (https://www.campllc.org/about-camp/).

FIG. 2 is an exemplary scenario where the RV 390 is behind the HV equipped with the system for target classification 100, according to one aspect. According to one aspect, if the HV is ahead of the RV 390, the HV may infer an own lane change using on-board sensor information. According to one aspect, path history trail points of another RV driving ahead of the HV may be utilized by the system for target classification 100 in a simultaneous or concurrent manner.

Figure 3:
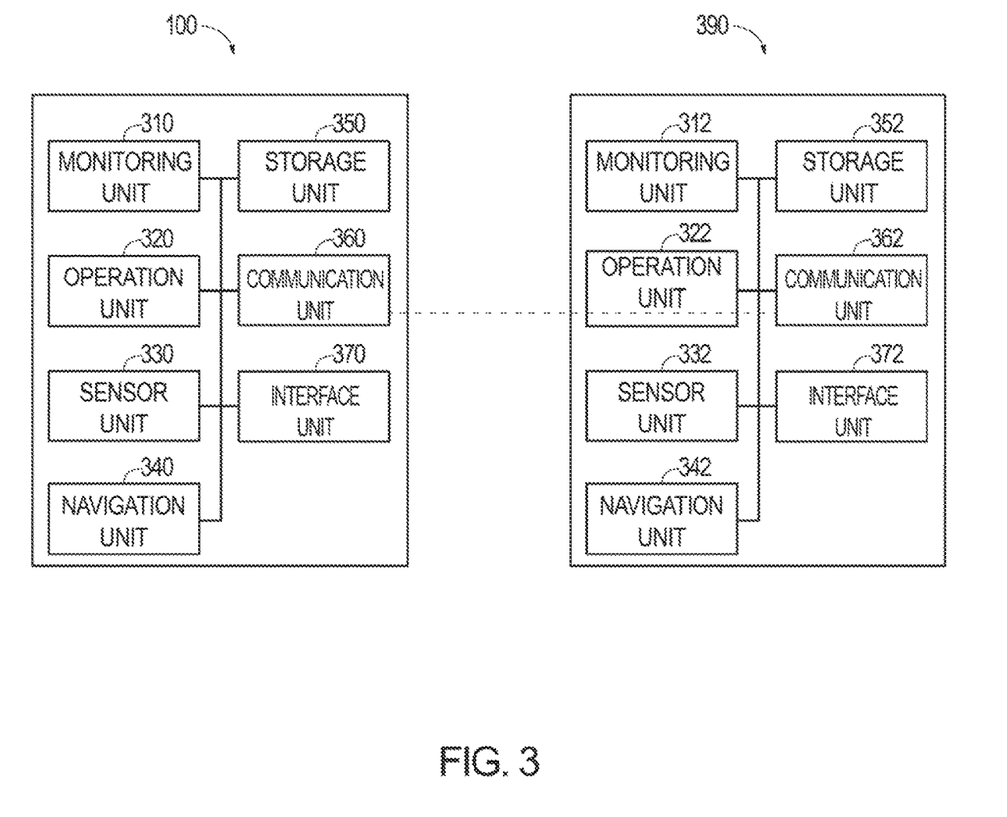
FIG. 3 is an exemplary component diagram of the remote vehicle in computer communication with the host vehicle equipped with the system for target classification via an operable connection, according to one aspect.

FIG. 3 is an exemplary component diagram of the remote vehicle in computer communication with the host vehicle equipped with the system for target classification 100 via an operable connection, according to one aspect. One or more systems and techniques for providing target classification or target vehicle classification are provided herein. For example, the HV may receive a plurality V2V messages from multiple vehicles or RVs. Each RV may be associated with a time series of V2V messages, but it is not necessarily directly accessible which RV is sending or transmitting which V2V message. In this regard, the system for target classification 100 may piece together GPS data from the V2V messages to determine a map of RVs around the HV a current operating environment.

As seen in FIG. 3, the HV and the RV 390 are engaged in V2V communication. The HV may include a monitoring unit 310, an operation unit 320, a sensor unit 330, a navigation unit 340, a storage unit 350, a communication unit 360, and an interface unit 370. The RV 390 may include a monitoring unit 312, an operation unit 322, a sensor unit 332, a navigation unit 342, a storage unit 352, a communication unit 362, and an interface unit 372. Although depicted with similar components, it will be appreciated that the RV 390 may not necessarily have all of the functionality of the HV, as will be discussed in greater detail below, such as the ability to determine the lane level position offset between the two vehicles (e.g., the RV 390 and the HV) based on appending V2V messages from the HV together. However, the system for target classification 100 may append messages together to achieve path history trail data which exceeds a message history length (e.g., 200 meters from a current location of the RV 390).

Explained yet again, any vehicle which has V2V communication capability, may or may not have an operation unit 320 configured to perform the "target classification" algorithm described herein and may have its own algorithm for "target classification", since "target classification" is not included in SAE standards for V2V communications. In this regard, the HV does not rely on other vehicle's target classification algorithms (i.e., RVs) and assumes that the RVs do not have the same algorithm for target classification. The HV may assume that other V2V-enabled vehicles (i.e., RVs) have generic V2V communication specifications which comply with general V2V standards. Therefore, even if the RV 390 does have the same algorithm as the HV for target classification, and is appending HV path history trail points, that appended trail of HV path history trail points in RV 390 is used by the RV 390 for its own target classification, and not target classification by the HV. In this regard, the operation unit 320 of the HV may execute the "target classification" algorithm to include path history trail appending procedure for any RVs in communication with the HV.

The communication unit 362 of the RV 390 and the communication unit 360 of the HV enable the RV 390 and the HV to engage in the V2V communication and may include communication logics. The RV 390 and the HV may broadcast, multicat, or unicat V2V messages to one another when within a communication sensing range and may be paired when communicating via the multicast/unicast V2V communication mode. Further the system for target classification 100 may be in computer communication with one or more vehicle systems, as described above.

The operation unit 322 of the RV 390 may receive indication of use of one or more steering inputs from a driver of the RV 390, such as an operating action from a steering wheel, automobile or vehicle pedals, such as a brake pedal, clutch pedal, throttle, accelerator, or gas pedal, etc. In other words, the operation unit 322 may receive one or more operating actions from the driver of the RV 390, and determine a variety of information associated with the RV 390, such as the steering wheel angle, the yaw rate, the lateral acceleration, longitudinal acceleration, velocity, heading, GPS information, CAN information of the RV 390, lane change detection information (which is optional and is not necessarily relied upon by the HV), etc. associated with the RV 390. The operation unit 322 may monitor other units or vehicle systems of the RV 390, such as cruise control systems or sub-systems, an autonomous cruise control (ACC) system, adaptive cruise control, radar cruise control, turn signal indicators, etc. In any event, the operation unit 322 may assemble the information or data associated with the RV 390 and generate a V2V message (e.g., of a time series of messages) to be broadcast or transmitted to the communication unit 360 of the HV. The V2V messages may be broadcast at a frequency and include the aforementioned information or data automatically, without any manual user or driver intervention from the driver of the RV 390 to start or stop the transmission of the V2V messages and/or associated information or data collation procedure or data logging.

The sensor unit 332 may detect or identify one or more objects, obstacles, hazards, or road hazards and associated or corresponding attributes or characteristics. For example, the sensor unit 332 may detect an object, a speed of the object, a distance of the object from the vehicle (e.g., RV or HV), a bearing or direction of travel of the object, a size of the object, a position or a location associated with the object, such as a lane location, etc.

According to one aspect, the sensor unit 332 may identify white lines and hard shoulders of a roadway or road segment to facilitate lane recognition. Further, the sensor unit 332 may identify or classify an object as another vehicle, a pedestrian, a cyclist, debris, a pothole, etc. The sensor unit 332 may include one or more radar units, image capture units, Lidar sensors, sensors, cameras, gyroscopes, accelerometers, scanners (e.g., 2-D scanners or 3-D scanners), or other measurement units.

The monitoring unit 312 of the RV 390 may monitor the operating environment of the RV 390 for objects or obstacles, as well as for indicators of a lane change, such as lane markings, rumble strips, etc. For example, the monitoring unit 312 may utilize information from the sensors of the sensor unit 332 to determine if lane markings on the roadway are indicative of lanes within the roadway. Explained in greater detail, the monitoring unit 312 of the RV 390 may be a lane change detection module which may utilize the information collected from the sensors of the sensor unit 332, from the operation unit 322, from the navigation unit 342, and/or any other vehicle systems to determine if and/or when the RV 390 changes lanes or infer when the RV 390 is about to change lanes. When the RV 390 passes over a lane marking, the monitoring unit 312 may determine a lane change for the RV 390. This information may be optionally included as part of the V2V message transmitted or broadcast by the RV 390 to other vehicles, such as the HV. The monitoring unit 310 of the HV may perform determination as to if and/or when the HV changes lanes or infer when the HV is about to change lanes in a similar fashion.

The operation unit 320 of the HV relies on its own lane change detection module within the monitoring unit 310 and V2V message information to infer lane changes of other vehicles (i.e., RV 390). Additionally, the operation unit 320 of the HV may also utilize the lane change detection module within the monitoring unit 310 to infer or determine a lane change for itself (i.e., a lane change for the HV).

The navigation unit 342 may include a GPS device and may detect a location or current location of the RV 390 or determine a navigation route along one or more road segments for the RV 390.

The operation unit 322 may predict a future path for the RV 390 based on information from the navigation unit 342, the monitoring unit 312, the sensor unit 332, etc. For example, the operation unit 322 may predict the future path for the RV 390 based on a current velocity, a current yaw rate, and a proposed navigation route from the navigation unit 342 or navigation device.

The storage unit 352 of the RV 390 may be a storage drive storing information collected by the monitoring unit 312, the operation unit 322, the sensor unit 332, and the navigation unit 342 of the RV 390, respectively. The storage unit 352 may store a location history of the RV 390, such as when the RV 390 travels along a navigation route, for example. Additionally, the storage unit 352 may store one or more images of objects or obstacles captured by a sensor unit 332 of the RV 390.

As previously discussed, the communication unit 360, 362 may facilitate communication between one or more units or sub-units of the system for target classification 100, vehicle-to-vehicle (V2V) communications, etc. For example, readings or information from a controller area network (CAN) of the RV 390 may be transmitted via the communication unit 362 of the RV 390. The CAN of the RV 390 may facilitate flow of this information among internal components of the RV 390. The communication unit 362 of the RV 390 may include a transmitter, a receiver, and/or a transceiver and may transmit a message, such as the V2V message. The transmitted V2V message may include information pertaining to the RV 390 previously collected via the monitoring unit 312, the operation unit 322, the sensor unit 332, and the navigation unit 342 of the RV 390. In this way, the RV 390 may transmit, to the HV, a time series of one or more messages. Each message may include a path history trail field including RV information up to a threshold amount of information, such as up to 200 meters, for example. According to one aspect, the messages may include the path prediction for the RV 390.

In any event, the communication unit 360, 362 may be capable of communicating, transmitting, or receiving data, commands, etc., such as the V2V message described above, etc., over a network, wireless network, using short range communication techniques, using long range communication techniques, over a cellular network, across a telematics channel, etc. Examples of such communications or transmissions may include a connection, a wireless connection, vehicle to pedestrian (V2P) communications, vehicle-to-vehicle (V2V) communications, vehicle to motorcycle (V2M) communications, vehicle to cloud communications, dedicated short range communications (DSRC), cellular vehicle to everything (C-V2X), 5G communications, etc.

With respect to FIGS. 1-2, the operation unit 320 of the HV may generally determine a center of rotation (0, HVPP-CENTER Y) 104. This center of rotation 104 may include a radius of curvature 106 of a predicted curve 108, calculated based on the current velocity of the HV and the yaw rate of the HV and/or other HV parameters from HV vehicle systems, and may be calculated utilizing one or more filtering and one or more smoothing algorithms or calculations.

In FIG. 1, the operation unit 320 of the HV may compare the predicted curve 108 to the path history trail (RVPos(M)) 110 of the RV 390 to a current position RVPos(0) of the RV 390, and project the path history trail onto the path prediction curve 108. The path history trail 110 of the RV 390 may include multiple path history trail points (RVPos (−1) 110*a*, RVPos (−2) 110*b*, RVPos (−3) 110*c*, RVPos (−4) 110*d*, RVPos (−5) 110*e*, RVPos (−6) 110*f*, RVPos (−7) 110*g*, RVPos (−8) 110*h*, etc.) and is not necessarily transmitted at any particular frequency or interval. The operation unit 320 of the HV may determine associated radii corresponding to the path history trail points for the RV 390 based on the path prediction curve 108 for the HV and the path history trail 110. For example, radius 112*a* corresponds to path history trail point 110*a*, radius 112*b* corresponds to path history trail point 110*b*, and radius 112 corresponds to an intersection (RVClosestPos) between an axis perpendicular to a heading of the HV and a line formed by the two closest points (e.g., 110*f* and 110*g*) from the RV path history trail 110 (however, the axis and the line formed by the two closest points are not necessarily perpendicular with one another). The current position HVPos(0) of the HV may be taken to be (0, 0) using Cartesian coordinates.

Thereafter, operation unit 320 of the HV may determine lateral offset distances (122, 122*a*, 122*b*, 102, etc.) for the RV based on the path prediction curve 108 for the HV and the path history trail 110. The operation unit 320 of the HV may calculate the Lateral Offset1 distance 102 by determining an axis perpendicular to the heading of the HV and examining the intersection between this axis and the line formed by the two closest points from the RV path history trail 110, which in FIG. 1 are using the RVPos(−M) 110*f* and RVPos(−(M+1)) 110*g*.

The estimated lane level position offset may be tiered or binned according to different threshold ranges to determine a number of lanes that the RV 390 is offset from the HV. According to one aspect, information from messages may be time weighted, meaning that the highest weight or most weight may be given to the most recent RV location, to determine a time weighted average of an offset between the RV 390 and the HV. According to another aspect, merely the Lateral Offset1 distance 102 is considered, without utilizing other Lateral Offset distances (122, 122*a*, 122*b*, etc.).

In FIG. 2, the HV is ahead of the RV 390, and the operation unit 320 of the HV may utilize the HV appended path history trail 210 to create a trail of HV positions 210*a*, 210*b*, 210*c*, 210*d*, 210*e*, 210*f*, 210*g*, 210*h* from a HV current position associated with the depicted HV at 100 all the way back to the position (between 210*f* and 210*g*) when the HV was next to (e.g., in terms of an instantaneous longitudinal direction of a roadway) the RV current position (e.g., in the same or adjacent lane with regard to the lane that the RV 390 is currently occupying) and calculating a Lateral Offset1 distance 202 using this HV path history trail, and then adjusting this base value (i.e., the Lateral Offset1 distance 102) according to the lane changes HV has made over this trail. In this way, HV lane change information may be inferred by the lane change detection module, which may be included within the monitoring unit 310 (running in the HV) using HV history or HV own information from on-board sensors, such as HV history of heading, yaw rate, longitudinal and lateral acceleration, longitudinal and lateral speed, steering wheel angle, etc.

According to one aspect, with respect to FIG. 2, the operation unit 320 of the HV may not need to determine lateral offsets 222, 222*a*, 222*b*, etc. and does not receive the path prediction 208 from the RV 390. Instead, the HV utilizes the path history trail 210 and corresponding points RVFrame_HVPos(−1) 210*a*, RVFrame_HVPos(−2) 210*b*, RVFrame_HVPos(−3) 210*c*, RVFrame_HVPos(−4) 210*d*, RVFrame_HVPos(−5) 210*e*, RVFrame_HVPos(−6) 210*f*, RVFrame_HVPos(−7) 210*g*, RVFrame_HVPos(−8) 210*h* along with the center of rotation (RVPPCenter Y) 204 to determine the associated radii 212*a*, 212*b*, 212, etc. The operation unit 320 may analyze the path history trail 210 from the current position of the HV RVFrame_HVPos(0) back to the current position (RVFrame_RVPos(0)) of the RV 390 taking into consideration an axis perpendicular to the heading of the RV 390 and examining the intersection (RVFrame_HVClosestPos) between this axis and the line formed by the two closest points from the HV path history trail 210, which in FIG. 2 are HVPos(−M) 210*f* and HVPos (−(M+1)) 210*g*, where M is the index of position points.

According to one aspect, messages may be transmitted or broadcast by the communication unit 362 of the RV 390 at a predetermined fixed frequency or a predetermined variable frequency in a continuous manner, such as at 10 hertz, for example. The V2V message, which may be a BSM, may include path history trail of RV information up to a threshold distance or threshold time, such as 200 meters, for example. In this way, a message may include some of or all of the GPS positioning data of the RV 390 from a current position or current location up to the past 200 meters, for example. The communication unit 362 may transmit this message (e.g., of the time series of messages) accordingly.

According to one aspect, V2V communications between two vehicles, such as the HV and the RV 390 may be enabled up to a threshold distance, such as 300 meters, for example. Assuming that this is the case, the communication unit 362 of the RV 390 may transmit messages which include truncated information with respect to the HV due to the difference in transmission range (e.g., 300 meters) versus message history range (e.g., 200 meters). In this regard, it may be possible for the HV and RV to be within communication range, but also within a range that the path history trail from the messages do not reach to the HV current location. In such a scenario, with reference to FIG. 1, a logic, such as the operation unit 320 may disregard one or more of the intermediate lateral offsets, such as a lateral offset 3 122*a*, lateral offset 4 122*b*, etc., and merely utilize lateral offset 2 122 (e.g., associated with the most current or most recent RV location) for the calculations described above. However, calculations based on this disregarded information may be error prone, especially when the operating environment includes curvy roads.

According to one aspect, the monitoring unit 310, the operation unit 320, the sensor unit 330, the navigation unit 340, the storage unit 350, the communication unit 360, and the interface unit 370 of the HV may perform similarly or identically to the corresponding units of the RV 390 and/or vice versa. In this regard, the monitoring unit 310 of the HV may perform lane change detection for the HV based on information received from sensors or operation actions associated with the HV. Similarly, the navigation unit 340 may determine a current position of the HV and track the path history position trail of the HV (e.g., which may effectively, act as an RV with respect to a different vehicle, including the RV 390).

As discussed above, the communication unit 360 of the HV may receive the time series of message from the communication unit 362 of the RV 390 and store the messages within a storage drive of the storage unit 350. For example, the communication unit 360 may receive a first message from the RV 390 at a first time and a second message from the RV 390 at a second time. The communication unit 360 may receive the first message and the second message at a predetermined fixed frequency or a predetermined variable frequency. The communication unit 360 of the HV may be engaged in vehicle-to-vehicle (V2V) communication with a communication unit of the RV 390.

The first message may include path history position trail information associated with the RV 390 from a predetermined distance range to a position of the RV 390 at the first time. The second message may include path history position trail information associated with the RV 390 from the predetermined distance range to a position of the RV 390 at the second time. Regardless, the storage unit 350 of the system for target classification 100 may store the first message, the second message, and additional messages as they are received from the RV 390.

The first message and the second message may be basic safety messages or any type of V2V message. The first message and the second message may include path history position trail information (e.g., GPS information), steering wheel angle information, yaw rate information, lateral acceleration information, longitudinal acceleration information, velocity information, timestamp information, or heading information associated with the RV 390 at the first time and the second time, respectively. Again, the messages may include any CAN, sensory, or GPS information from the RV according to V2V message content creation standards, for example. Further, the first message and the second message may optionally include lane change detection information provided by the operation unit 322 of the RV 390.

The operation unit 320 may determine the first message and the second message are from the same RV based on the overlap between the path history position trail information of the first message and the second message (e.g., overlap of or common GPS locations and/or timestamps reported by both messages of the RV 390). The operation unit 320 may, according to another aspect, determine the first message and the second message are from the same RV based on a common or unique identifier (ID) from the messages of the RV 390. For example, if the first message contains path history position trail information indicating that the RV 390 was at {A, B, C, D, E, F} and the second message contains path history position trail information indicating that the RV 390 was (or is) at {D, E, F, G, H, J}, the operation unit 320 may determine that this is the same RV and to append the path history position trail information of the first message with the path history position trail information of the second message, thereby generating {A, B, C, D, E, F, G, H, J} as an overall path history position trail information for RV. This appending may continue as additional messages are received on a rolling basis at the predetermined fixed frequency or predetermined variable frequency.

The operation unit 320 may append the path history position trail information of the first message with the path history position trail information of the second message based on an overlap between the path history position trail information of the first message and the second message to determine an overall path history position trail for the RV 390 and may calculate a lane level position offset between the HV and the RV 390 based on the overall path history position trail for the RV 390 and a current position of the HV.

The operation unit 320 may calculate lane change detection information associated with the RV 390 based on the V2V messages received from the RV 390. As previously discussed, the operation unit 320 may determine lane change detection information associated with the HV based on information received from one or more vehicle systems of the HV. In this way, the operation unit 320 may calculate the lane level position offset between the HV and the RV 390 based on the appended path history trail for the RV and at least one of the lane change detection information associated with the HV and the lane change detection information associated with the RV 390.

The interface unit 370 may include a display portion and an input portion. The interface unit 370 may receive one or more user inputs from one or more users, which may include passengers, drivers, occupants, operators, etc. of the HV via the input portion. The input portion of the interface unit 370 may enable a user, such as a driver or occupant, to interact with or provide input, such as user input, gestures, clicks, points, selections, voice commands, etc. to the system for target classification 100.

As an example, the input portion of the interface unit 370 may be implemented as a touch screen, a touchpad, a track pad, one or more hardware buttons (e.g., on a radio or a steering wheel), one or more buttons, such as one or more soft buttons, one or more software buttons, one or more interactive buttons, one or more switches, a keypad, a microphone, one or more sensors, etc. According to one aspect, the interface unit 370 may be implemented in a manner which integrates a display portion such that the interface unit 370 both provides an output (e.g., renders content as the display portion) and receives inputs (e.g., user inputs). An example of this may be a touch screen. Other examples of input portions may include a microphone for capturing voice input from a user.

Regardless, the interface unit 370 may receive a variety of user inputs, such as verbal commands, spoken commands (e.g., utilizing a microphone or audio sensor), pressing of buttons, activating switches, gesture inputs, such as a swipe, a multi-finger swipes, a pinch and zoom, a touch (e.g., utilizing a touch screen), a press (e.g., via pressure sensors), a press and hold, a selection, a movement of a cursor, a click (e.g., utilizing a button, mouse button, a hardware button, a soft button, a software button, track button), etc. In this way, the interface unit 370 may receive one or more user inputs, such as from a user, driver, passenger, or other occupant of the HV.

According to one aspect, the display portion of the interface unit 370 may render the operating environment and/or information associated with one or more other vehicles in the vicinity. In this way, the system for target classification 100 may provide refined target classification.

Figure 4:
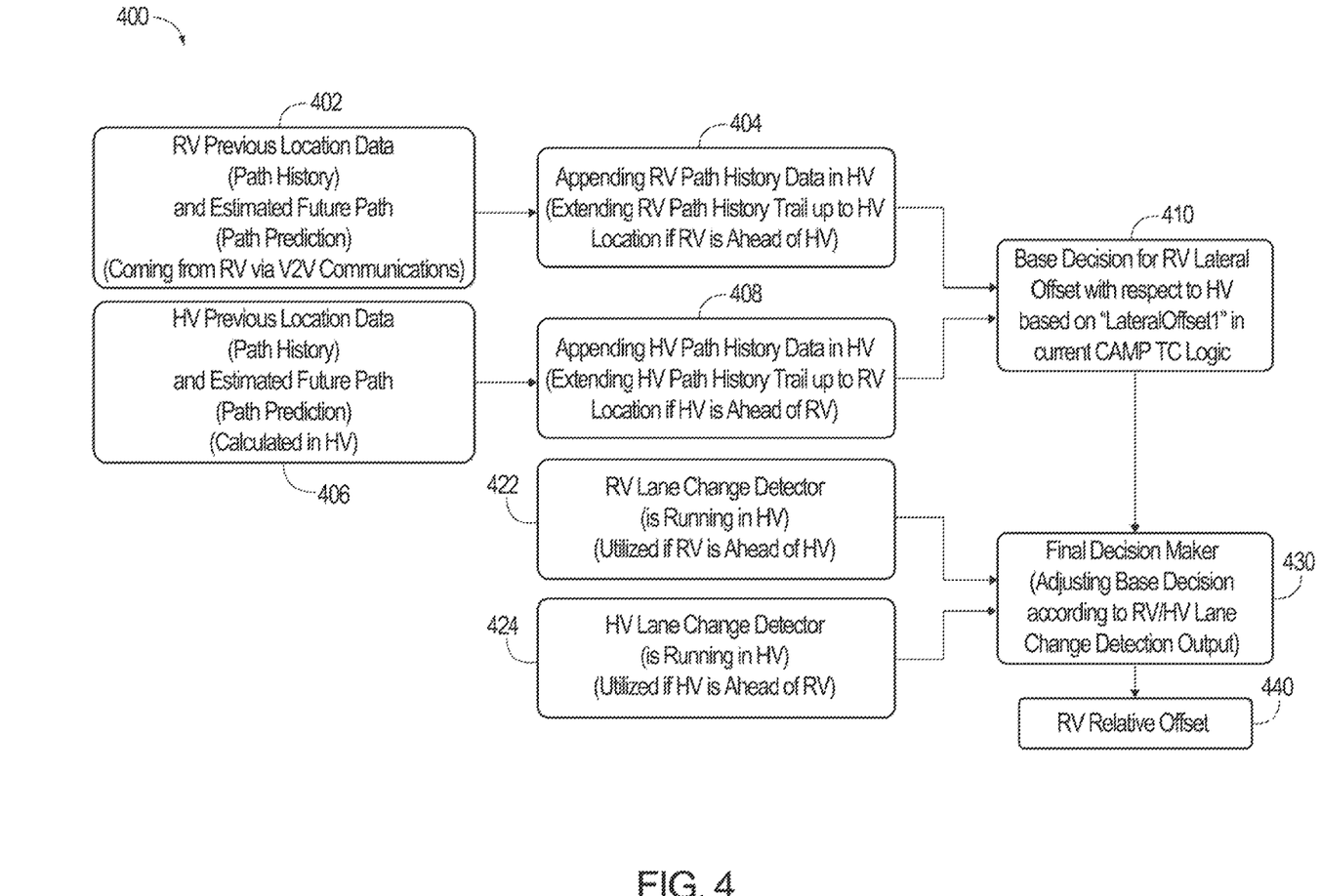
FIG. 4 is an exemplary flow diagram of a method for target classification, according to one aspect.

FIG. 4 is an exemplary flow diagram of a method 400 for target classification, according to one aspect. The method 400 for target classification may include determining which V2V messages come from a single, target RV, appending the location data from multiple V2V messages from the target RV, and analyzing the appended location data, thereby extending a distance covered by the RV past location history and bringing the path history trail data all the way back to the (current) position of the HV if the RV is currently driving ahead of the HV, or appending the HV's own path history trail (previous location) data and bringing the HV appended path history trail all the way back to the current position of the RV if the HV is currently driving ahead of the RV.

At 402, messages are received from the RV (e.g., in a scenario where the RV is ahead of the HV), such as receiving a first message from the RV at a first time, receiving a second message from the RV at a second time. The first message includes path history position trail information associated with the RV from a predetermined distance range to a position of the RV at the first time and the second message includes path history position trail information associated with the RV from the predetermined distance range to a position of the RV at the second time.

At 404, the method 400 for target classification may include appending the path history position trail information of the first message with the path history position trail information of the second message based on an overlap between the path history position trail information of the first message and the second message to determine an overall path history position trail for the RV.

At 410, regardless of the relative positions of the RV and the HV, the method 400 for target classification may include determining or selecting one or more lateral offsets between the HV and the RV to utilize for decision making. With reference to FIGS. 1-2, the Lateral Offset1 distance 102 and the Lateral Offset1 distance 202 for both cases of the HV being ahead of the RV or the HV being behind the RV, the base or initial value of the HV-RV lateral offset may be calculated by the HV using the current position of the vehicle which is driving behind and extended path history trail of the vehicle which is currently driving ahead. Then, after calculating this initial (i.e., base) value, the base value may be adjusted by using a total number of detected lane changes of HV and RV to reflect the actual current lateral offset between HV and RV.

As previously discussed, lane changes associated with the RV and lane changes associated with the HV are both determined by the HV. For example, the operation unit 320 may determine the lane change associated with the RV based on V2V message information received from the RV 390 while the monitoring unit 310 may determine any lane change associated with the HV based on CAN data, sensor data from the sensor unit 330, or GPS information from the navigation unit 340, for example. In this way, the HV may utilize time series of its own data history (e.g., yaw rate history, acceleration history, etc.) to detect its own lane changes. The HV may also utilize time series of RV data history (e.g., yaw rate history, acceleration history, etc.), received via V2V messages from the RV 390, to detect the RV's lane changes.

At 406, the method 400 for target classification may include identifying the HV location history and estimating a future path using path prediction in the HV.

At 408, the method 400 for target classification may include calculating the Lateral Offset1 distance 202 when the HV is driving ahead of the RV 390. The HV may utilize the HV own path history trail data and extend the HV path history trail all the way back to the current location of the RV 390 to calculate this Lateral Offset1 distance 202. This may include having the HV perform a target classification task and extending the HV own path history trail all the way back to the current RV location to calculate the Lateral Offset1 distance 202 as the base value for the lateral offset between the HV and the RV 390.

At 422, the HV may determine lane change detection information associated with the RV 390 based on V2V messages received from the RV to adjust the base at 430. By adjusting the base decision based on any lane change detection for either the HV or RV and determine the RV relative offset at 440. In this way, the method 400 may use the RV's time series information (e.g., the RV's time series info of yaw rate history, acceleration history, etc.) coming from the RV via the V2V communication messages, and by utilizing these time series to determine if RV has made any lane changes.

At 424, the HV may collect lane change detection information for the HV from vehicle systems of the HV (e.g., GPS, CAN, sensory systems, including history of time series of yaw rate information, heading information, acceleration information, speed, steering wheel information, etc.) and utilize the lane change detection information of the HV to calculate the lateral offset at 430 and 440.

At 430, the method 400 may further include adjusting this base value of the Lateral Offset1 distance 202 based on the total HV and RV lane changes detected by the HV lane change detection module (e.g., monitoring unit 310 and/or operation unit 320) to determine the final lateral offset between the HV and the RV 390. At 430, lane change detection information associated with the HV and/or the RV may be utilized to determine the relative offset at 440. Results associated with the RV lane change detection of 422 and/or the HV lane change detection of 424 may be utilized simultaneously at 430 to adjust the base or initial lateral offset value from 410 and generate the final result of the HV-RV lane level lateral offset to be reported as a final result at 440.

Figure 5:
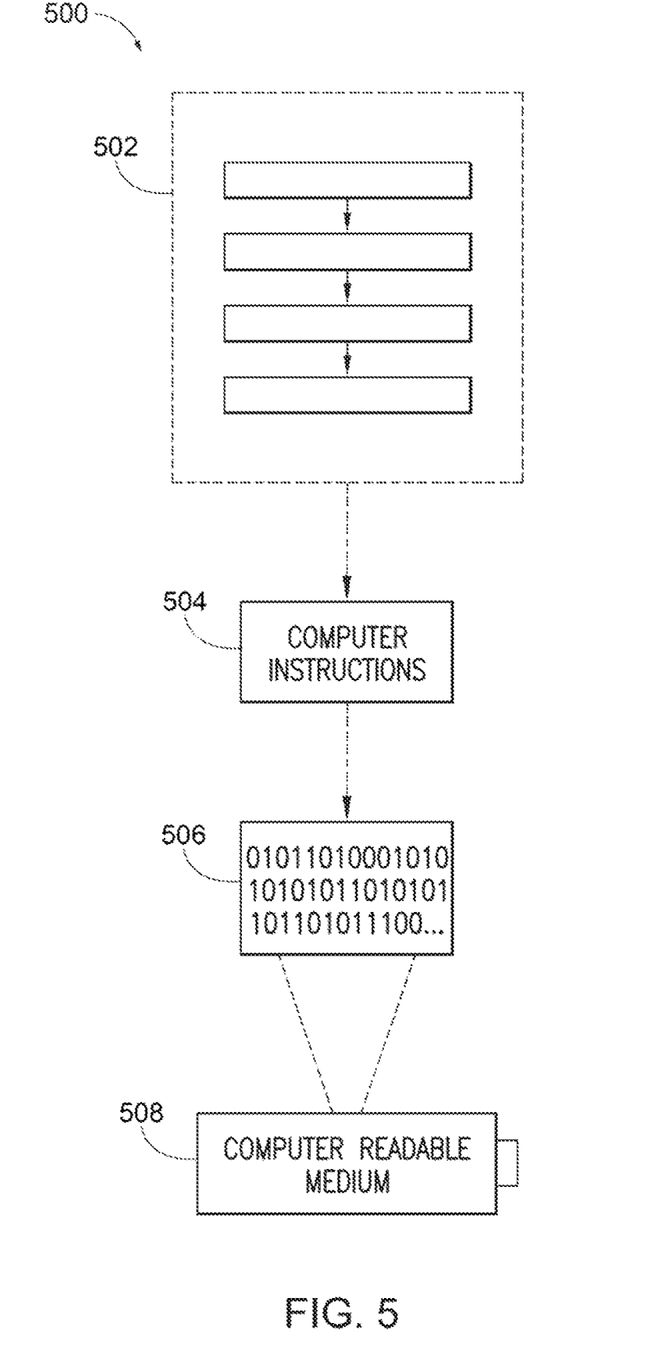
FIG. 5 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This encoded computer-readable data 506, such as binary data including a plurality of zero's and one's as shown in 506, in turn includes a set of processor-executable computer instructions 504 configured to operate according to one or more of the principles set forth herein. In this implementation 500, the processor-executable computer instructions 504 may be configured to perform a method 502, such as the method 400 of FIG. 4. In another aspect, the processor-executable computer instructions 504 may be configured to implement a system, such as the system for target classification 100 of FIGS. 1-3. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 6:
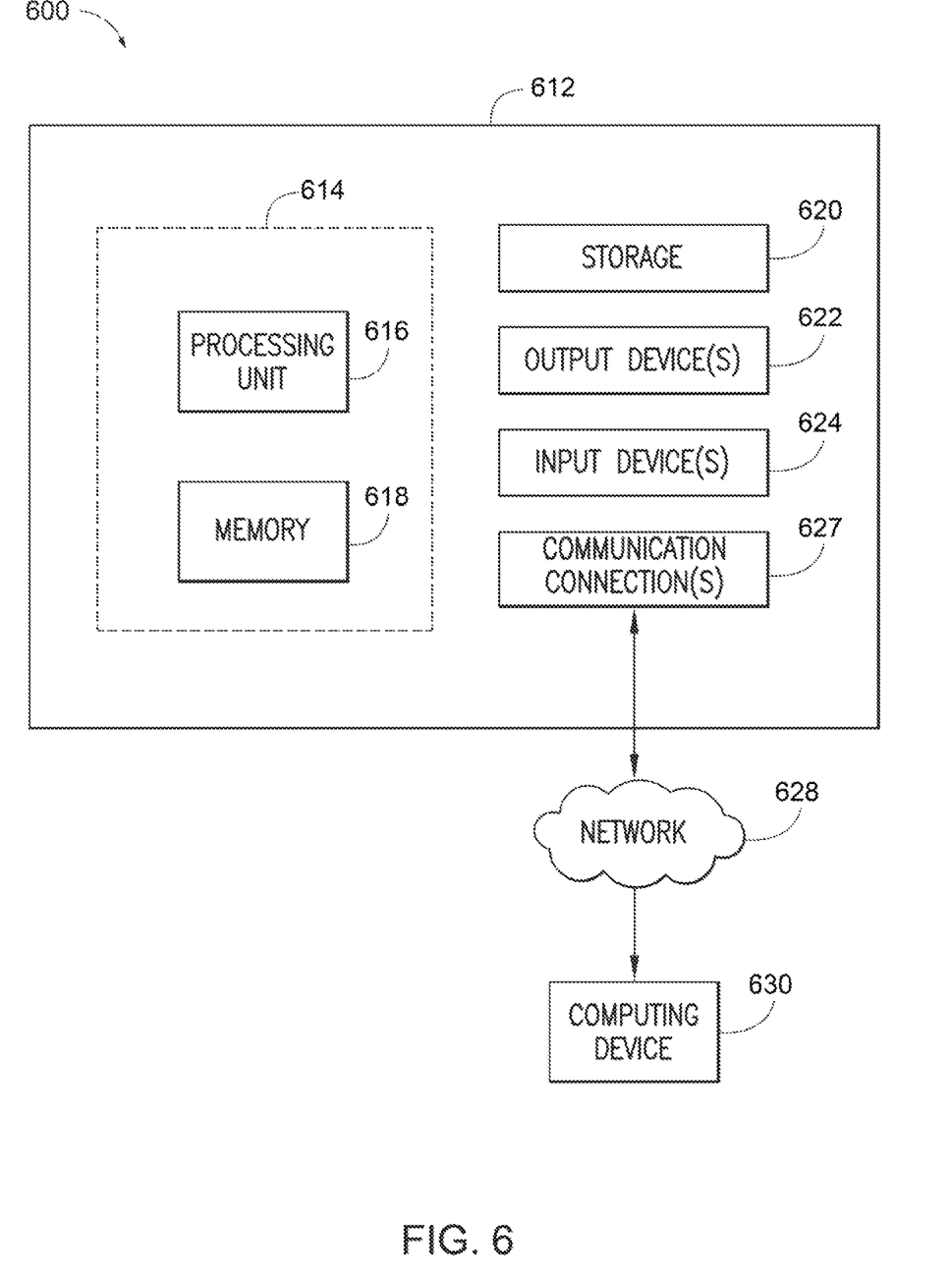
FIG. 6 is an illustration of an example computing environment where one or more of the provisions set forth herein are implemented, according to one aspect.

FIG. 6 and the following discussion provide a description of a suitable computing environment to implement aspects of one or more of the provisions set forth herein. The operating environment of FIG. 6 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, cloud computing, edge computing, mobile edge computing (MEC), distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 6 illustrates a system 600 including a computing device 612 configured to implement one aspect provided herein. In one configuration, the computing device 612 includes at least one processing unit 616 and memory 618. Depending on the exact configuration and type of computing device, memory 618 may be volatile, such as RAM, non-volatile, such as ROM, flash memory, etc., or a combination of the two. This configuration is illustrated in FIG. 6 by dashed line 614.

Any of the above described units, components, or modules (e.g., the HV monitoring unit, operation unit, sensor unit, navigation unit, storage unit, communication unit, and interface unit, the RV monitoring unit, operation unit, sensor unit, navigation unit, storage unit, communication unit, and interface unit) may be implemented via a processor and memory, such as via the processing unit 616 and the memory 618.

In other aspects, the computing device 612 includes additional features or functionality. For example, the computing device 612 may include additional storage such as removable storage or non-removable storage, including, but not limited to, magnetic storage, optical storage, etc. Such additional storage is illustrated in FIG. 6 by storage 620. In one aspect, computer readable instructions to implement one aspect provided herein are in storage 620. Storage 620 may store other computer readable instructions to implement an operating system, an application program, etc. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 612. Any such computer storage media is part of the computing device 612.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 612 includes input device(s) 624 such as keyboard, mouse, pen, voice input device, touch input device, infrared cameras, video input devices, or any other input device. Output device(s) 622 such as one or more displays, speakers, printers, or any other output device may be included with the computing device 612. Input device(s) 624 and output device(s) 622 may be connected to the computing device 612 via a wired connection, wireless connection, or any combination thereof. In one aspect, an input device or an output device from another computing device may be used as input device(s) 624 or output device(s) 622 for the computing device 612. The computing device 612 may include communication connection(s) 626 to facilitate communications with one or more other devices 630, such as through network 628, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for target classification associated with a host vehicle (HV), comprising:
   a communication unit, implemented via a processor:
   receiving a first message from a remote vehicle (RV) at a first time, wherein the first message includes path history position trail information associated with the RV from a predetermined distance range to a position of the RV at the first time; and
   receiving a second message from the same RV at a second time by identifying the RV that transmitted the first message using a unique identifier common between the first message and the second message, wherein the second message includes path history position trail information associated with the RV from the predetermined distance range to a position of the RV at the second time; and
   an operation unit, implemented via the processor:
   appending the path history position trail information of the first message with the path history position trail information of the second message from the same RV based on an overlap between the path history position trail information of the first message and the second message to determine an overall path history position trail for the RV, wherein the overall path history position trail includes a future path prediction for the RV; and
   calculating a lane level position offset between the HV and the RV based on the overall path history position trail for the RV and a current position of the HV.

2. The system for target classification of claim 1, comprising a navigation unit determining the current position of the HV.

3. The system for target classification of claim 1, wherein the operation unit determines the first message and the second message are from the same RV based on the overlap between the path history position trail information of the first message and the second message.

4. The system for target classification of claim 1, wherein the operation unit determines lane change detection information for the RV based on the first message and the second message from the RV and calculates the lane level position offset between the HV and the RV based on the lane change detection information and the overall path history position trail for the RV.

5. The system for target classification of claim 1, comprising a storage unit storing the first message and the second message.

6. The system for target classification of claim 1, wherein the first message and the second message include steering wheel angle information, yaw rate information, heading information, velocity information, longitudinal acceleration information, or lateral acceleration information associated with the RV at the first time and the second time, respectively.

7. The system for target classification of claim 1, wherein the first message and the second message are vehicle-to-vehicle (V2V) messages.

8. The system for target classification of claim 1, wherein the communication unit receives the first message and the second message at a predetermined fixed frequency or a predetermined variable frequency.

9. The system for target classification of claim 1, wherein the communication unit of the HV is engaged in vehicle-to-vehicle (V2V) communication with a communication unit of the RV.

10. The system for target classification of claim 1, comprising a monitoring unit performing lane change detection for the HV based on information received from sensors or operation actions associated with the HV.

11. A host vehicle (HV) equipped with a system for target classification, comprising:
    a communication unit, implemented via a processor:
    receiving a first message from a remote vehicle (RV) at a first time, wherein the first message includes path history position trail information associated with the RV from a predetermined distance range to a position of the RV at the first time; and
    receiving a second message from the same RV at a second time by identifying the RV that transmitted the first message using a unique identifier common between the first message and the second message, wherein the second message includes path history position trail information associated with the RV from the predetermined distance range to a position of the RV at the second time; and
    an operation unit, implemented via the processor:
    appending the path history position trail information of the first message with the path history position trail information of the second message from the same RV based on an overlap between the path history position trail information of the first message and the second message to determine an overall path history position trail for the RV, wherein the overall path history position trail includes a future path prediction for the RV; and
    calculating a lane level position offset between the HV and the RV based on the overall path history position trail for the RV, a current position of the HV, and one of lane change detection information for the RV or lane change detection information for the HV.

12. The host vehicle of claim 11, comprising a navigation unit determining the current position of the HV.

13. The host vehicle of claim 11, wherein the operation unit determines the first message and the second message are from the same RV based on the overlap between the path history position trail information of the first message and the second message.

14. The host vehicle of claim 11, wherein the operation unit determines the lane change detection information for the RV based on the first message and the second message from the RV and calculates the lane level position offset between the HV and the RV based on the lane change detection information and the overall path history position trail for the RV.

15. The host vehicle of claim 11, wherein the first message and the second message include steering wheel angle information, yaw rate information, heading information, velocity information, longitudinal acceleration information, or lateral acceleration information associated with the RV at the first time and the second time, respectively.

16. The host vehicle of claim 11, wherein the first message and the second message are vehicle-to-vehicle (V2V) messages.

17. A method for target classification, comprising:
receiving a first message from a remote vehicle (RV) at a first time, wherein the first message includes path history position trail information associated with the RV from a predetermined distance range to a position of the RV at the first time;
receiving a second message from the same RV at a second time by identifying the RV that transmitted the first message using a unique identifier common between the first message and the second message, wherein the second message includes path history position trail information associated with the RV from the predetermined distance range to a position of the RV at the second time;
appending the path history position trail information of the first message with the path history position trail information of the second message from the same RV based on an overlap between the path history position trail information of the first message and the second message to determine an overall path history position trail for the RV, wherein the overall path history position trail includes a future path prediction for the RV; and
calculating a lane level position offset between a host vehicle (HV) and the RV based on the overall path history position trail for the RV and a current position of the HV.

18. The method for target classification of claim 17, comprising, determining the current position of the HV.

19. The method for target classification of claim 17, comprising, storing the first message and the second message at the HV.

20. The method for target classification of claim 17, wherein the first message and the second message are vehicle-to-vehicle (V2V) messages.

* * * * *